(12) United States Patent  (10) Patent No.: US 8,708,620 B2
Sasaki et al.  (45) Date of Patent: Apr. 29, 2014

(54) ANTI-VIBRATION TOOL HOLDER

(75) Inventors: Takaaki Sasaki, Aichi Pref. (JP);
Tsunekazu Ishida, Aichi Pref. (JP)

(73) Assignee: Yamazaki Mazak Corporation, Aichi Pref. (JP)

( * ) Notice: Subject to any disclaimer, the term of this patent is extended or adjusted under 35 U.S.C. 154(b) by 239 days.

(21) Appl. No.: 13/259,095

(22) PCT Filed: Dec. 1, 2009

(86) PCT No.: PCT/JP2009/070184
§ 371 (c)(1),
(2), (4) Date: Sep. 22, 2011

(87) PCT Pub. No.: WO2011/067828
PCT Pub. Date: Jun. 9, 2011

(65) Prior Publication Data
US 2012/0003055 A1   Jan. 5, 2012

(51) Int. Cl.
*B23B 31/107*  (2006.01)
(52) U.S. Cl.
CPC .................................. *B23B 31/107* (2013.01)
USPC .......................................... 408/143; 409/141
(58) Field of Classification Search
USPC ............................................. 408/143; 279/83
See application file for complete search history.

(56) References Cited

U.S. PATENT DOCUMENTS

| 3,507,508 | A | * | 4/1970 | Andrews | 279/83 |
| 6,280,126 | B1 | * | 8/2001 | Slocum et al. | 409/141 |
| 6,321,855 | B1 | * | 11/2001 | Barnes | 173/211 |
| 6,537,000 | B1 | * | 3/2003 | Weck | 409/141 |
| 2009/0139811 | A1 | | 6/2009 | Mochihara | |
| 2009/0155010 | A1 | | 6/2009 | Cook | |

FOREIGN PATENT DOCUMENTS

| CN | 1390666 | 1/2003 |
| CN | 101460273 | 6/2009 |
| CN | 101554666 | 10/2009 |
| JP | 1-117803 U | 8/1989 |
| JP | 02-000005 U | 1/1990 |
| JP | 05-277806 A | 10/1993 |
| JP | 2001-138162 A | 5/2001 |
| JP | 2006-150460 A | 6/2006 |
| JP | 3836606 B2 | 8/2006 |
| JP | 2009-133433 A | 6/2009 |

OTHER PUBLICATIONS

Chinese Office Action for Chinese Application No. 200980159423.5 dated Oct. 12, 2013. English translation not provided.

* cited by examiner

*Primary Examiner* — Daniel Howell
*Assistant Examiner* — Alan Snyder
(74) *Attorney, Agent, or Firm* — Patterson Thuente Pedersen, P.A.

(57) ABSTRACT

A tool holder is provided that prevents chattering in a large-sized cutting tool. A tool holder 1 includes an anti-vibration device provided in a radially outer portion of a body. The anti-vibration device has a ring-shaped first anti-vibration member and a second anti-vibration member. The anti-vibration device is fixed to the body together with a cutting tool $T_1$ by means of a bolt. Four O-rings are arranged on both sides of the first anti-vibration member, and the damper property is adjusted by pressing a pressing plate with adjuster bolts. An appropriate gap is formed between the first anti-vibration member and the body and between the first anti-vibration member and the second anti-vibration member.

4 Claims, 6 Drawing Sheets

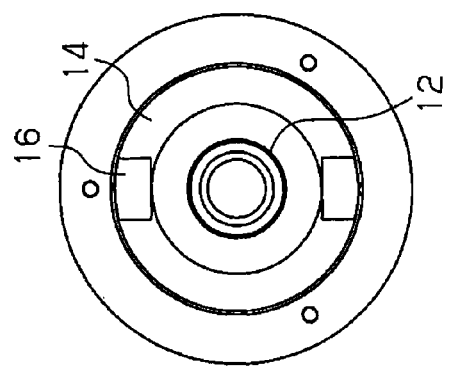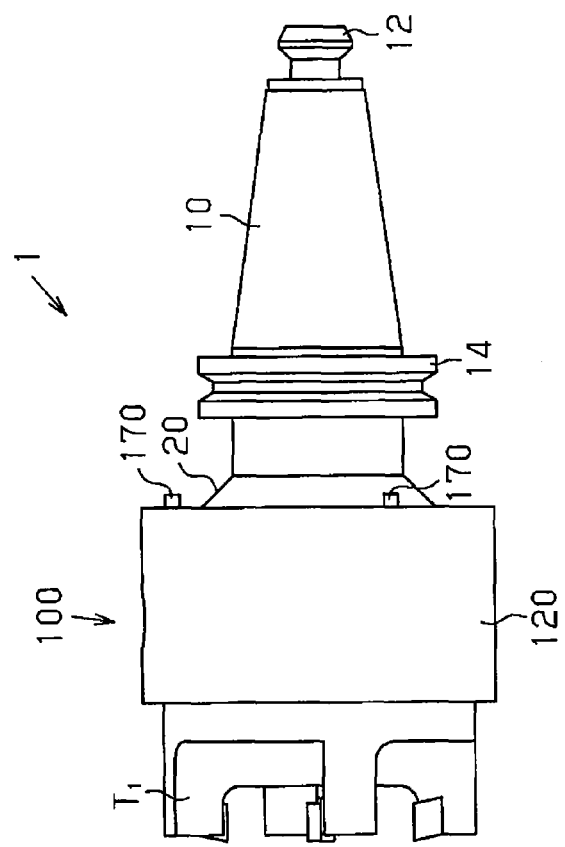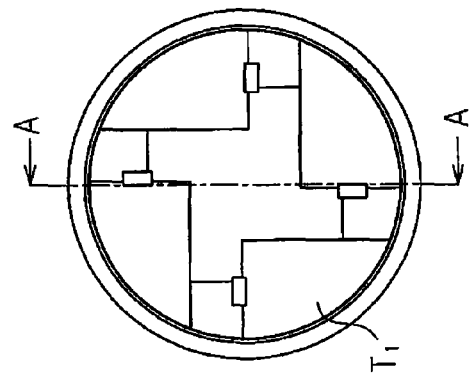

A-A

ANTI-VIBRATION TOOL HOLDER

RELATED APPLICATIONS

The present application is a National Phase entry of PCT Application No. PCT/JP2009/070184, filed Dec. 1, 2009, the disclosure of which is hereby incorporated by reference herein in its entirety.

FIELD OF THE INVENTION

The present invention relates to a tool holder for holding a cutting tool for a machine tool that has an anti-vibration mechanism.

BACKGROUND OF THE INVENTION

For example, Japanese Laid-Open Patent Publication No. 2006-150460 and Japanese Laid-Open Patent Publication No. 2001-138162 each disclose a tool holder having a single anti-vibration ring on the outer circumferential portion.

Also, Japanese Patent No. 3836606 of the applicant of the present invention discloses a tool holder in which an anti-vibration ring is held by a rubber O-ring.

PRIOR ART DOCUMENTS

Patent Documents

Patent Document 1: Japanese Laid-Open Patent Publication No. 2006-150460
Patent Document 2: Japanese Laid-Open Patent Publication No. 2001-138162
Patent Document 3: Japanese Patent No. 3836606

SUMMARY OF THE INVENTION

It is an objective of the present invention to provide a tool holder that improves its anti-vibration performance by a double-layered damper mechanism.

To achieve the foregoing objective, a tool holder of the present invention includes, as basic means, a shank member to be held by a tool spindle of a machine tool, a cylindrical body coupled to the shank member, an attachment hole located in a radially inner portion of the body, an anti-vibration device fitted to a radially outer portion of the body, and a bolt. A straight shank of a cutting tool is inserted into the attachment hole. The bolt is inserted in a radial direction through the anti-vibration device to fix the straight shank of the cutting tool to the attachment hole of the body.

The anti-vibration device is characterized by having a ring-shaped first anti-vibration member fitted to the radially outer portion of the body of the anti-vibration holder, a cylindrical second anti-vibration member fitted to the radially outer portion of the first anti-vibration member, and four O-rings arranged at radially inner and outer portions at both ends of the first anti-vibration member. Each end of the first anti-vibration member has a trapezoidal cross-sectional shape. The O-rings are each arranged on one of the inner and outer circumferential surfaces of the ends of the first anti-vibration member. The first anti-vibration member is in contact with two of the O-rings in a wedge-like manner.

The second anti-vibration member is characterized by having a wall surface at an end facing the shank and a groove formed in the radially inner portion at both ends to receive a seal ring.

The present invention is also characterized in that a disk-shaped pressing plate is provided on a side of the first anti-vibration member that faces the shank. The pressing plate presses the O-rings. Three threaded holes are formed in the wall surface of the second anti-vibration member that faces the shank, and three adjuster bolts are screwed into the threaded holes to press the pressing plate.

Further, the present invention is characterized in that the inner diameter of the first anti-vibration member is greater than the outer diameter of the body by substantially 0.1 mm, and the inner diameter of the second anti-vibration member is greater than the outer diameter of the first anti-vibration member by substantially 0.1 mm.

EFFECTS OF THE INVENTION

Having the above described configuration, an anti-vibration tool holder according to the present invention is capable of effectively preventing the occurrence of chattering even when used with a large cutting tool.

BRIEF DESCRIPTION OF THE DRAWINGS

FIG. 2A is a front view showing the anti-vibration tool holder;
FIG. 2B is a left side view showing the anti-vibration tool holder;
FIG. 2C is a right side view showing the anti-vibration tool holder.

DETAILED DESCRIPTION OF THE PREFERRED EMBODIMENTS

Figure 1:
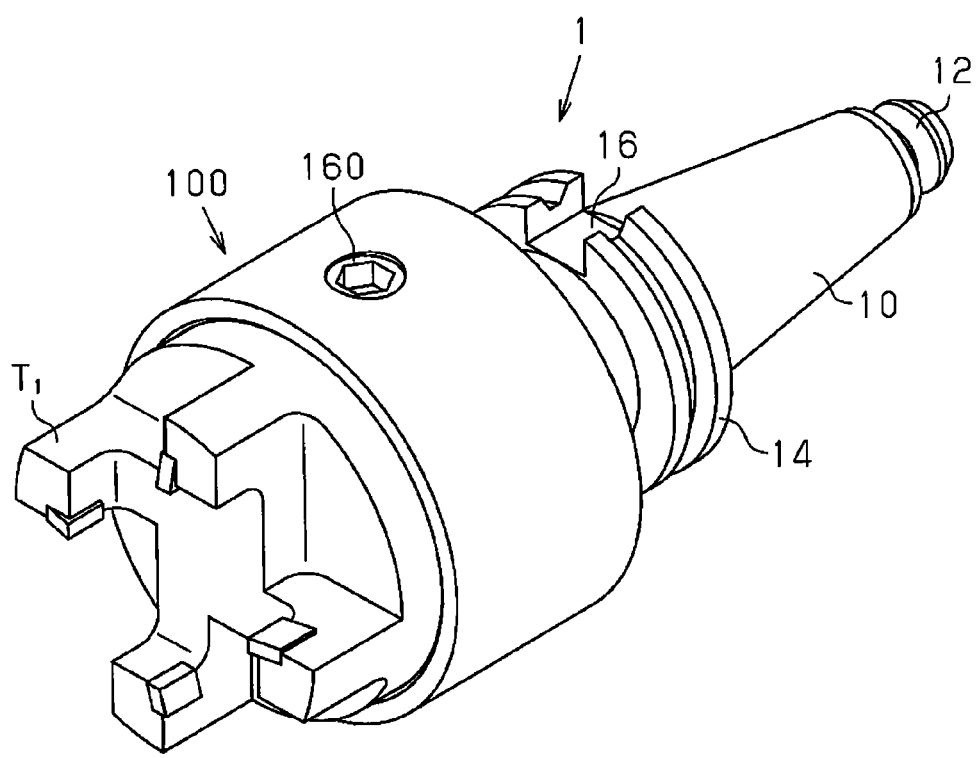
FIG. 1 is a perspective view showing the appearance of an anti-vibration tool holder according to the present invention.
Figure 3:
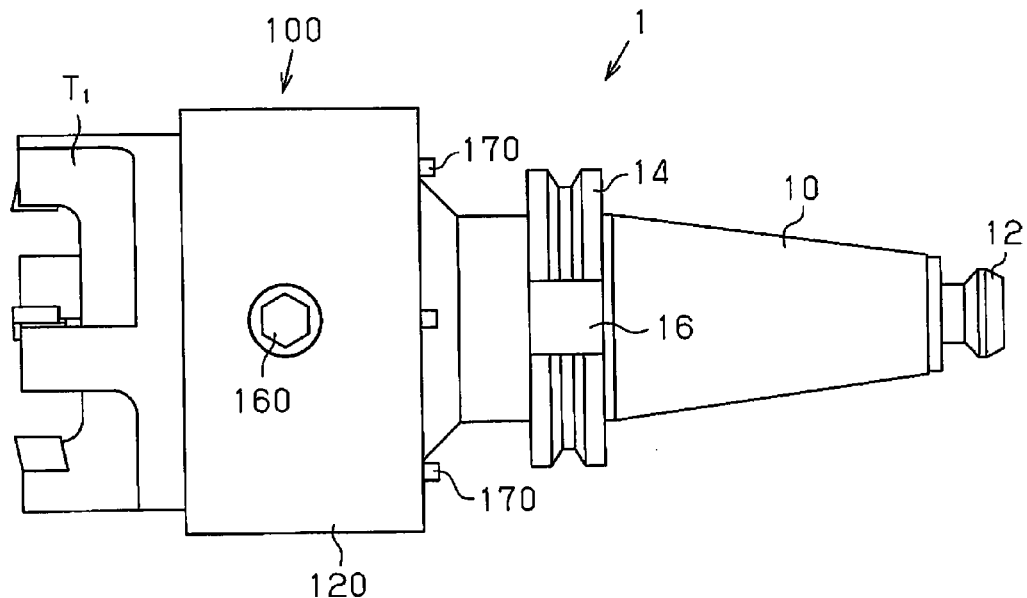
FIG. 3 is a top plan view showing the anti-vibration tool holder.
Figure 4:
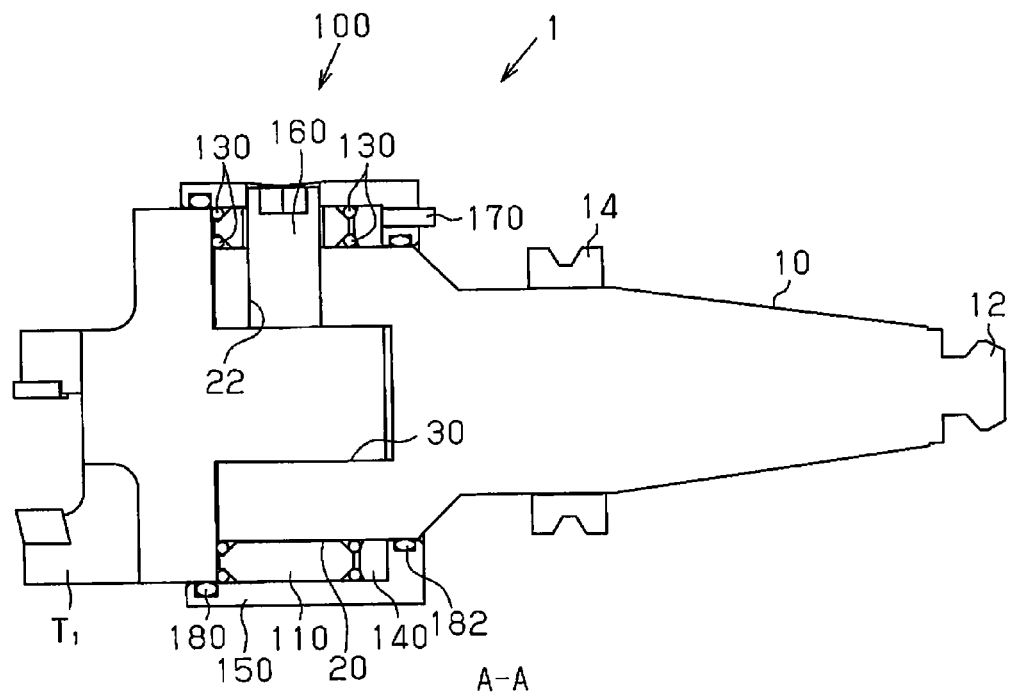
FIG. 4 is a cross-sectional view taken along line A-A of FIG. 2.

FIG. 1 is a perspective view showing the appearance of an anti-vibration tool holder according to the present invention. FIG. 2A is a front view showing the anti-vibration tool holder. FIG. 2B is a left side view showing the anti-vibration tool holder. FIG. 2C is a right side view showing the anti-vibration tool holder. FIG. 3 is a top plan view showing the anti-vibration tool holder. FIG. 4 is a cross-sectional view taken along line A-A of FIG. 2.

The tool holder, the entirety of which is indicated by reference numeral 1, includes a shank portion 10 which is inserted into a tool spindle of a machine tool. A pull stud bolt 12 is attached to one end of the shank portion 10. The shank portion 10 is coupled to a holder body 20 with a tool holder grip portion 14 to be gripped by means of an ATC. The tool holder grip portion 14 has a pair of keyways 16.

The body 20 of the tool holder 1 has a cylindrical shape and includes a tool attachment hole 30. A cutting tool $T_1$ is attached to the tool holder 1 together with an anti-vibration device 100.

FIG. 4 shows a cross-sectional structure of the anti-vibration device 100 according to the present invention.

The attachment hole 30 is formed in the radially inner portion of the cylindrical body 20 of the tool holder. The cutting tool $T_1$ is inserted into the attachment hole 30. Also, a threaded hole 22 is formed in the body 20 to receive a bolt for fixing the cutting tool $T_1$.

A ring-shaped first anti-vibration member 110 is fitted about the outer circumferential portion of the body 20. Four rubber O-rings 130 are arranged on the outer and inner circumferences at both ends of the first anti-vibration member 110. A bolt hole 112 for receiving a bolt 160 is formed in the first anti-vibration member 110.

A second anti-vibration member 150 is fitted about the outer circumferential portion of the first anti-vibration member 110. The shape of the second anti-vibration member 150 will be described in detail with reference to FIG. 6. The second anti-vibration member 150 has a hole 152 through which the bolt 160 for fixing the cutting tool $T_1$ is inserted. Seal rings 180, 182 are fitted in the inner sides at both ends. The second anti-vibration member 150 has a wall portion on the side facing the shank. Three threaded holes 158 are formed in the circumference of the wall portion.

A disk-shaped pressing plate 140 is arranged on a side that faces the threaded holes 158 formed in a wall portion of the second anti-vibration member 150.

Three adjuster bolts 170 are screwed to the threaded holes 158 formed in the wall portion of the second anti-vibration member 150. By adjusting the amount of insertion of the adjuster bolts 170, the amount of compression of the four O-rings 130 is adjusted via the pressing plate 140. Accordingly, the property of the damper can be adjusted.

Figure 5A:
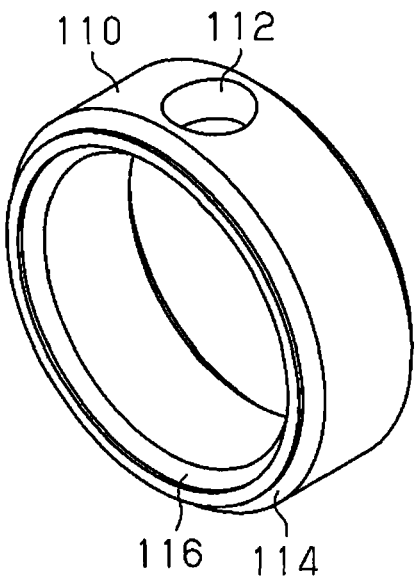
FIG. 5A is a diagram showing the appearance of a first anti-vibration member 110 in detail.
Figure 5B:
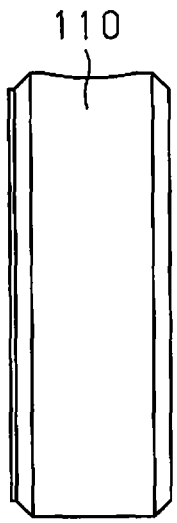
FIG. 5B is a front view showing the first anti-vibration member 110.
Figure 5C:
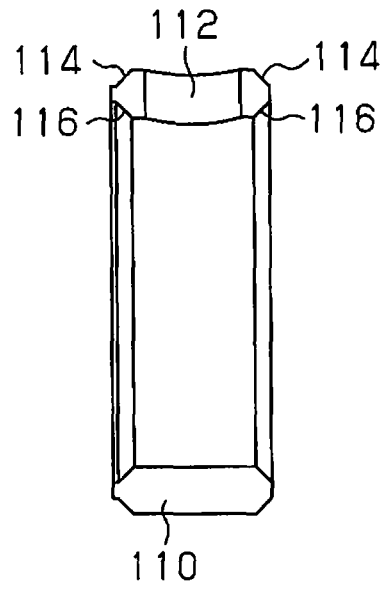
FIG. 5C is a cross-sectional view showing the first anti-vibration member 110.

FIG. 5A is a diagram showing the appearance of the first anti-vibration member 110 in detail. FIG. 5B is a front view of the first anti-vibration member 110, and FIG. 5C is a cross-sectional view showing the first anti-vibration member 110.

The ring-shaped first anti-vibration member 110 has a single bolt hole 112. The outer circumferential portions at both ends of the first anti-vibration member 110 are formed into tapered surfaces 114. Furthermore, the inner circumferential portion at both ends thereof is also formed into tapered surfaces 116. That is, both end faces of the first anti-vibration member 110 have a trapezoidal cross-sectional shape, and are in contact with O-rings in a wedge-like manner.

Figure 6A:
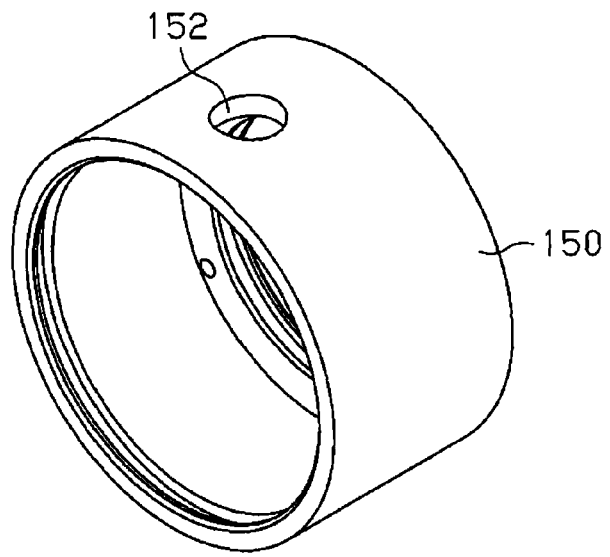
FIG. 6A is a diagram showing the appearance of a second anti-vibration member 150 in detail.
Figure 6B:
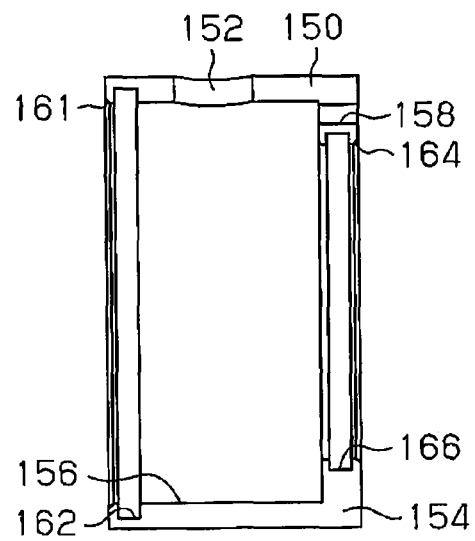
FIG. 6B is a side view showing the second anti-vibration member 150.
Figure 6C:
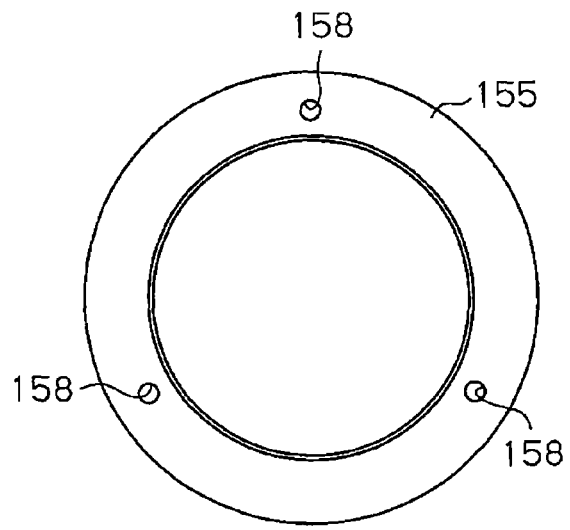
FIG. 6C is a cross-sectional view showing the second anti-vibration member 150.

FIG. 6A is a diagram showing the appearance of the second anti-vibration member 150 in detail. FIG. 6B is a side view of the second anti-vibration member 150, and FIG. 6C is a cross-sectional view showing the second anti-vibration member 150.

The second anti-vibration member 150 is a cylindrical member having a wall portion 154. A single bolt hole 152 is formed in the cylindrical surface. The inner diameter of a radially inner portion 156 of the second anti-vibration member 150 is formed to be greater than the outer diameter of the first anti-vibration member 110 by approximately 0.1 mm. A radially inner portion 161 of the second anti-vibration member 150 on the side facing the cutting tool is fitted about the outer circumferential portion of the cutting tool. A groove 162 for receiving a seal ring is formed on the inner surface of the radially inner portion 161, and the seal ring 180 shown in FIG. 4 is fitted in the groove 162.

The end of the second anti-vibration member 150 on the side facing the shank is formed into a wall surface 155. The inner diameter of a radially inner portion 164 at the wall surface 155 is set relative to the outer diameter of the tool holder body 20 such that there is a gap between the radially inner portion 164 and the holder body 20. A seal ring receiving groove 166 is also formed in the inner surface of the radially inner portion 164. The seal ring 182 is fitted in the groove 166.

When attaching a cutting tool $T_1$ to the tool holder 1, the straight shank of the cutting tool T1 is inserted into the attachment hole 30 of the holder body 20, so that the anti-vibration device 100 of the present invention is fitted about the outside of the holder body 20 and the cutting tool $T_1$.

Then, the bolt 160 is inserted through the bolt holes of the first anti-vibration member 110 and the second anti-vibration member 150 and screwed into the threaded hole 22 of the holder body 20, so that the bolt 160 is pressed against the cutting tool $T_1$. Accordingly, the cutting tool $T_1$ is fixed.

Subsequently, three adjuster bolts 170 are evenly screwed to press the pressing plate 140, so that an appropriate pressing force is applied to the four O-rings 130.

The damper property of the entire anti-vibration device 100 can be adjusted by changing the compression amount of the O-rings 130.

When cutting by the cutting tool $T_1$ is performed, the damper property is adjusted according to the occurrence of chattering, so as to remove the cause of the chattering.

According to the anti-vibration device of the present invention, the anti-vibration members have a two-layered ring structure, which ensures significant anti-vibration performance.

Figure 7:
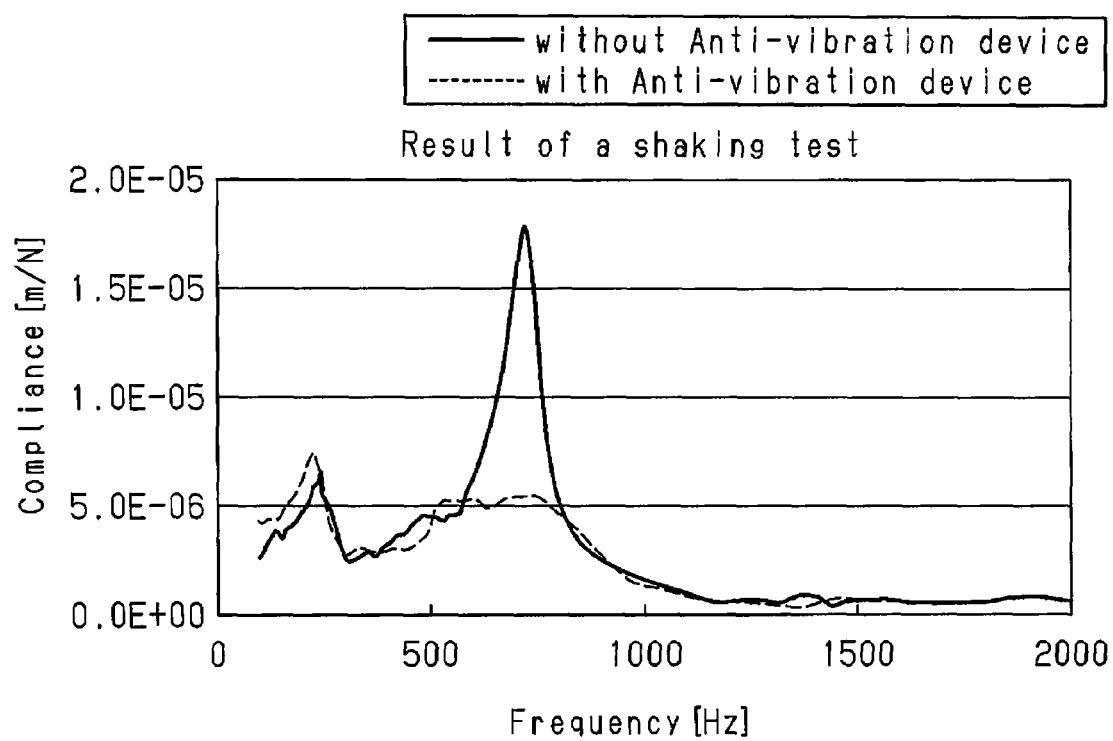
FIG. 7 is a graph showing the advantageous effects of the present invention.

FIG. 7 is a graph showing the advantageous effects of the present invention. In the drawing, the solid line shows the anti-vibration property when the anti-vibration device is not used, and the broken line shows the anti-vibration property when the anti-vibration device of the present invention is used.

It was confirmed through experiments that, with the anti-vibration device of the present invention, the compliance m/N was reduced from 1.8E-5 to 5.5E-6 in the region of the natural frequency of 730 Hz.

DESCRIPTION OF THE REFERENCE NUMERALS

1 . . . Tool holder
10 . . . Shank portion
20 . . . Body
22 . . . Threaded hole
30 . . . Tool attachment hole
100 . . . Anti-vibration device
110 . . . First anti-vibration member
130 . . . O-ring
140 . . . Pressing plate
150 . . . Second anti-vibration member
160 . . . Bolt
170 . . . Adjuster bolt

The invention claimed is:

1. A tool holder comprising:
a shank member to be held by a tool spindle of a machine tool;
a cylindrical body coupled to the shank member;
an attachment hole formed in a radially inner portion of the body;
an anti-vibration device fitted to a radially outer portion of the body; and a bolt, wherein a straight shank of a cutting tool is inserted into the attachment hole, the bolt is inserted in a radial direction through the anti-vibration device to fix the straight shank of the cutting tool to the attachment hole of the body, wherein the anti-vibration device includes:

a ring-shaped first anti-vibration member fitted to the radially outer portion of the body of the anti-vibration holder;

a cylindrical second anti-vibration member fitted to the radially outer portion of the first anti-vibration member; and four O-rings arranged at radially inner and outer portions at both ends of the first anti-vibration member, wherein each end of the first anti-vibration member has a trapezoidal cross-sectional shape, the O-rings are each arranged on one of the inner and outer circumferential surfaces of the ends of the first anti-vibration member, and the first anti-vibration member is in contact with two of the O-rings in a wedge-like manner.

2. The anti-vibration tool holder according to claim 1, wherein the second anti-vibration member includes a groove formed in the radially inner portion at both ends to receive a seal ring.

3. The anti-vibration tool holder according to claim 1, further comprising a disk-shaped pressing plate provided on a side of the first anti-vibration member that faces the shank, the pressing plate pressing the O-rings, wherein the second anti-vibration member has a wall surface at an end facing the shank, three threaded holes for adjuster bolts formed in the wall surface, and three adjuster bolts screwed into the threaded holes to press the pressing plate.

4. The anti-vibration tool holder according to claim 1, wherein the inner diameter of the first anti-vibration member is greater than the outer diameter of the body by substantially 0.1 mm, and the inner diameter of the second anti-vibration member is greater than the outer diameter of the first anti-vibration member by substantially 0.1 mm.

* * * * *